O. PENDELL.
FURNACE.
APPLICATION FILED MAR. 9, 1918.

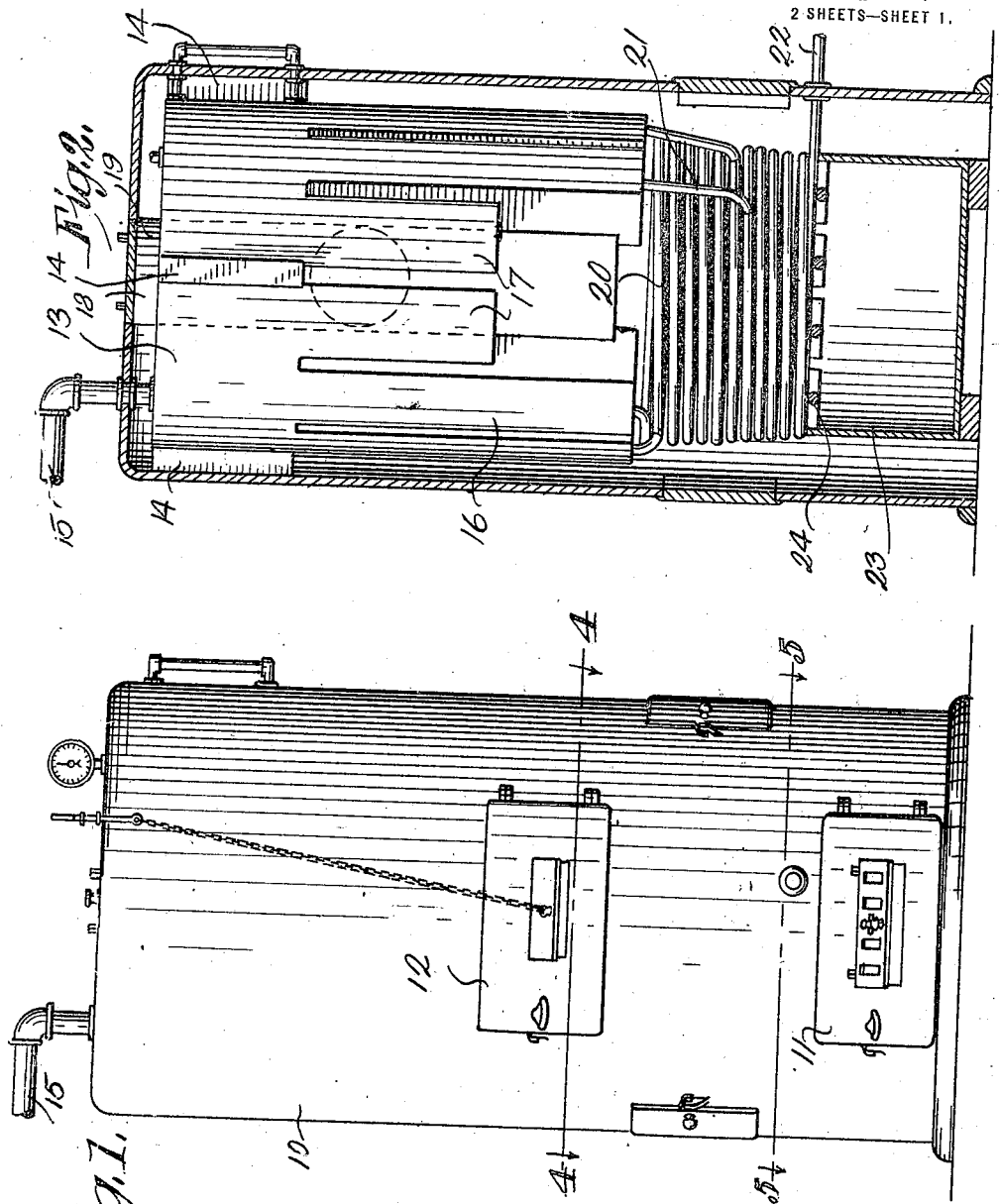

1,279,419.

Patented Sept. 17, 1918.
2 SHEETS—SHEET 2.

WITNESSES
R. W. Hoagland

INVENTOR
Orville Pendell,
BY
ATTORNEY

UNITED STATES PATENT OFFICE.

ORVILLE PENDELL, OF SCHENECTADY, NEW YORK.

FURNACE.

1,279,410.

Specification of Letters Patent.    Patented Sept. 17, 1918.

Application filed March 9, 1918. Serial No. 221,563.

*To all whom it may concern:*

Be it known that I, ORVILLE PENDELL, a citizen of the United States, residing at Schenectady, in the county of Schenectady and State of New York, have invented certain new and useful Improvements in Furnaces, of which the following is a specification.

This invention has relation to improvements in furnaces for heating plants, or the like, and has for an object to provide a furnace designed with a view to insuring its operation at maximum efficiency so as to economize in the use of fuel.

Another object of the invention is to provide an improved steam generating boiler and furnace structure whereby to insure the uniform and proper combustion of the fuel and to utilize all or the greater portion of the heat generated by the combustion of the fuel to evaporate the water, thereby providing a generating plant of the highest efficiency.

A still further object of the invention is to provide a boiler and furnace structure for steam generating plants, including a fire pot constructed in a manner to permit the circulation of water therethrough whereby to absorb heat from the burning fuel in conjunction with a boiler structure of improved design constructed in a manner to secure the circulation of the gases of combustion throughout the boiler to absorb the heat therefrom.

A still further object of the invention is to provide a boiler for steam generating plants including a drum formed with a plurality of spaced depending extensions forming water pockets around which the heated gases from the furnace are circulated to absorb all the heat from the gases thereby increasing the efficiency of operation of the boiler.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:—

Figure 1, is a view in front elevation of a furnace and boiler structure constructed in accordance with my invention.

Fig. 2, is a view thereof in vertical section.

Figure 3:
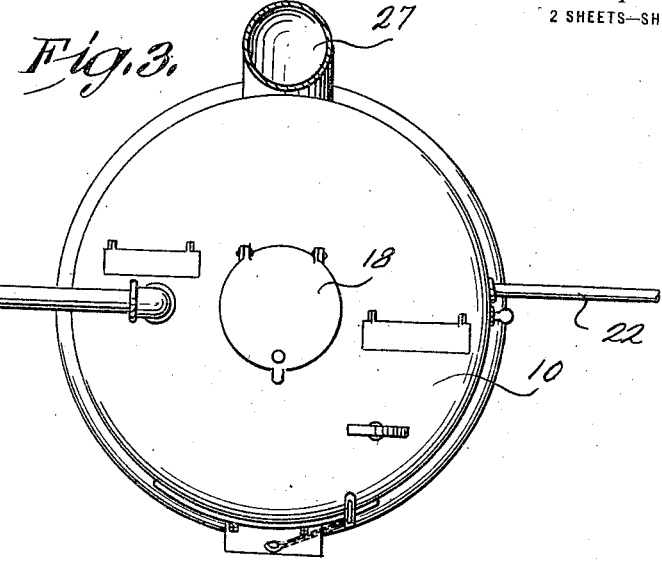
Fig. 3, is a view of the furnace structure in plan.
Figure 4:
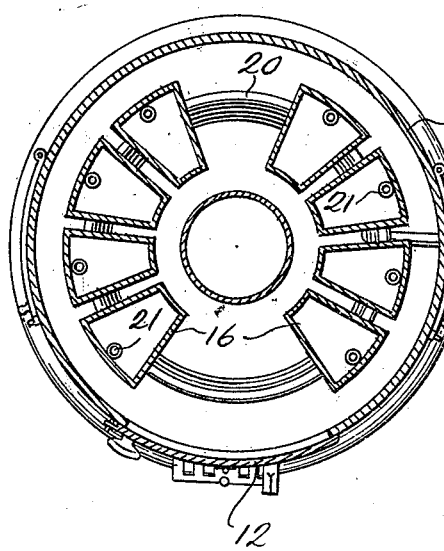
Fig. 4, is a horizontal section taken on the line 4—4 of Fig. 1.
Figure 5:
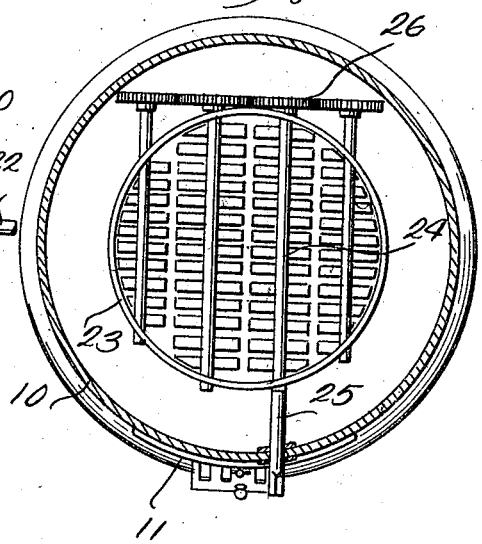
Fig. 5, is a similar view taken on the line 5—5 thereof.

With reference to the drawings 10 indicates a shell of substantially cylindrical construction having an opening at its lower end closed by an ash door 11, and an opening vertically spaced from said ash door closed by a door 12, enabling communication to be had with the fire box. Mounted within the shell at the upper end thereof is a steam drum 13 in circumferentially spaced relation to the shell as indicated in Fig. 2. The drum 13 is formed exteriorly with lugs 14 which engage the inner surface of the shell to support and retain the drum in said spaced relation. A steam pipe 15 is connected to the upper portion of the drum and forms an exit for the vapor. The drum 13 is of an annular construction in cross section and is formed with an annular series of depending water legs 16, all being uniformly spaced apart. The water legs 16 at the front of the furnace, specially indicated at 17, are shorter than the others, whereby to provide an aperture for registration with the entrance of the furnace which is closed by the door 12. Mounted centrally within the drum is a vertical tube 18 forming a coal magazine which extends through an opening in the upper end of the shell 10 which is normally closed by a door 19. The lower end of the tube 18 extends to a point adjacent the lower end of the water leg 16 as indicated. Located beneath the lower end of the water legs 16 is the body of a fire pot comprising a coil of pipe 20 having its convolutions slightly spaced. Branches 21 are then extended from certain of the convolutions and are connected to the lower ends of the water legs 16 as shown in Fig. 2. The upper extremity of the pipe 20 forming the coil leads to one of the water legs 16 while the lower end indicated at 22 may be connected to a source of water supply controllable by a valve. The fire pot body formed by the coil 20 is substantially inverted fusto-conical in formation and the lower end rests upon an ash box 23 located within the furnace structure from which ashes may be removed through the door 11. The grate structure indicated at 24 comprises a plurality of grate bars in parallel relation having their ends journaled in the upper portion of the ash box 23, one of the bars indicated at 25 is extended beyond the others and through an opening in the shell 10 whereby a handle or the like may be applied thereto to rotate said grate bar. The opposite ends of the grate bars are then connected by means of gears 26 whereby to insure rotation of the grate bars in unison in the usual manner.

In use, the fuel is placed within the coil 20 and is supported by the grate 24. The magazine 18 may be filled with fuel so that it is automatically fed by gravity into the fire box as the fuel becomes consumed, and the ashes are shaken into the ash box by manipulation of the grate. The heat of the burning fuel in the fire pot is transmitted to the coil 20 thereby causing circulation of the fluid contained therein, whereby the water in the water legs 16 is likewise heated. The burning gases from the fuel rise upwardly toward the exit indicated at 27, and in passing through the spaces between the water legs 16, heat said water legs thereby raising the temperature of the water. The greater portion of the heat is abstracted from the gases of combustion before they effect an exit from the furnace structure, and hence the operation of this furnace and boiler is conducted with a maximum efficiency. It will be obvious that this boiler and furnace structure may be applicable to hot water heating plants, and in that event the water will be rapidly heated and the circulation through the plant considerably facilitated and accelerated. Other uses and advantages of this improved furnace and boiler will readily occur to those skilled in the art to which this invention appertains.

While I have illustrated and described my invention with some degree of particularity I realize that in practice various alterations thereof may be made, and I therefore desire to reserve the right and privilege of changing the form of the details of construction and arrangement of the correlative parts without departing from the spirit of the invention or the scope of the appended claims.

Having thus described my invention what I claim as new and desire to secure by Letters Patent is:—

1. In a boiler and furnace construction, a fire pot comprising a coil of piping having its convolutions slightly spaced, a boiler mounted above the coil of annular formation, a plurality of depending water legs from said boiler, a connection between the upper end of the coil and one of the water legs, a connection at the lower end of the coil for connection to the water supply, branches connecting various convolutions of the coil and the several water legs, and a grate structure mounted at the lower end of the coil.

2. In a boiler and furnace construction, a vertical cylindrical shell, a steam boiler of annular construction mounted at the upper end thereof in spaced relation, lugs on the exterior of said boiler contacting the interior surface of the shell to retain the boiler in spaced relation thereto, a tubular magazine extending vertically through the center, water legs depending from the under side of the boiler in mutual spaced relation, a fire pot comprising a coil of piping located beneath the boiler having its upper end connected to one of the water legs, a connection at the lower end of the coil to a source of water supply, branches connecting various convolutions of the coil to an ash box located beneath the fire pot, and a grate structure mounted in the upper end of the ash box.

In testimony whereof I affix my signature in presence of two witnesses.

ORVILLE PENDELL.

Witnesses:
   Del. B. Salmon,
   Nellie M. Doyle.